(12) United States Patent
Yoshida (10) Patent No.: US 7,724,712 B2
(45) Date of Patent: May 25, 2010

(54) COMMUNICATION CONTROL METHOD AND WIRELESS COMMUNICATION APPARATUS

(75) Inventor: Jun Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 10/593,321

(22) PCT Filed: Apr. 8, 2005

(86) PCT No.: PCT/JP2005/007280

§ 371 (c)(1),
(2), (4) Date: Sep. 18, 2006

(87) PCT Pub. No.: WO2005/101745

PCT Pub. Date: Oct. 27, 2005

(65) Prior Publication Data

US 2008/0261640 A1    Oct. 23, 2008

(30) Foreign Application Priority Data

Apr. 14, 2004   (JP)   ............... 2004-119259

(51) Int. Cl.
| H04W 4/00 | (2009.01) |
| H04J 1/00 | (2006.01) |
| H04J 3/24 | (2006.01) |
| H04B 7/00 | (2006.01) |
| H04B 1/38 | (2006.01) |
| H04M 1/00 | (2006.01) |

(52) U.S. Cl. ............. 370/338; 370/343; 370/349; 370/332; 455/517; 455/41.2; 455/557; 455/552.1

(58) Field of Classification Search ........... 455/41.2, 455/403, 410–411, 416, 445, 448, 500, 507, 455/515–520, 556.1–556.2, 561, 566–567, 455/63.3, 67.11, 88, 418–421, 422.1, 423–425, 455/434, 450–451, 452.1–452.2, 453, 464, 455/502, 509, 526, 550.1, 552.1, 553.1, 557–558; 370/265, 310, 328–330, 332, 337–338, 341, 370/343, 349–350
See application file for complete search history.

(56) References Cited

U.S. PATENT DOCUMENTS 5,757,388 A * 5/1998 Stephenson ............ 347/2
(Continued)

FOREIGN PATENT DOCUMENTS

AU          767841 B2    11/2003
(Continued)

OTHER PUBLICATIONS

PCT International Search Report and Written Opinion of the International Searching Authority; Mailing Date Jul. 28, 2005.
(Continued)

*Primary Examiner*—Meless N Zewdu
(74) *Attorney, Agent, or Firm*—Fitzpatrick, Cella, Harper & Scinto (57) ABSTRACT

A printer (103) belongs to a service set (107) and communicates via an access point (101) in the infrastructure mode. The printer (103) searches for a beacon periodically. If a beacon is received from a terminal such as a digital camera (104), the printer registers the terminal address, service-set identifier and communication mode, which are contained in the beacon, in a function table. The printer sends each terminal, which has been registered in the function table, a frame that is for searching for a terminal that has a required function. If the response to the frame is positive, then the printer registers the fact that the search succeeded in the function table. A similar function search is conducted also by a digital camera (104) for which a print command has been issued, and the digital camera creates a function table. If there is a terminal (a printer) having the required function, the digital camera (104) transmits print data to this terminal.

9 Claims, 8 Drawing Sheets

U.S. PATENT DOCUMENTS

| | | | |
|---|---|---|---|
| 5,794,146 A | 8/1998 | Sevcik et al. | |
| 5,893,037 A * | 4/1999 | Reele et al. | 455/556.1 |
| 6,230,015 B1 * | 5/2001 | Kinnunen et al. | 455/450 |
| 6,477,384 B2 * | 11/2002 | Schroderus et al. | 455/500 |
| 6,522,881 B1 | 2/2003 | Feder et al. | |
| 6,580,700 B1 | 6/2003 | Pinard et al. | |
| 6,862,737 B1 | 3/2005 | Iwamura et al. | 719/321 |
| 6,904,298 B2 * | 6/2005 | Arai et al. | 455/556.1 |
| 7,120,129 B2 | 10/2006 | Ayyagari et al. | |
| 7,310,158 B2 | 12/2007 | Nakao et al. | |
| 7,327,385 B2 * | 2/2008 | Yamaguchi | 348/207.1 |
| 2003/0065952 A1 | 4/2003 | Otsuka | |
| 2003/0100335 A1 | 5/2003 | Gassho et al. | 455/552 |
| 2003/0125087 A1 | 7/2003 | Shimizu | |
| 2003/0142652 A1 | 7/2003 | Ting et al. | |
| 2003/0186721 A1 * | 10/2003 | Kanazawa et al. | 455/552.1 |
| 2004/0009769 A1 | 1/2004 | Yokoyama | |
| 2004/0063458 A1 | 4/2004 | Hori et al. | |
| 2004/0125778 A1 * | 7/2004 | Lin et al. | 370/338 |
| 2004/0172440 A1 * | 9/2004 | Nakajima et al. | 709/200 |
| 2004/0246934 A1 * | 12/2004 | Kim | 370/338 |

FOREIGN PATENT DOCUMENTS

| | | |
|---|---|---|
| EP | 1 241 838 A2 | 9/2002 |
| JP | 8-307394 A | 11/1996 |
| JP | 8-307934 | 11/1996 |
| JP | 10-84572 A | 3/1998 |
| JP | 11-252114 A | 9/1999 |
| JP | 2000-209234 A | 7/2000 |
| JP | 2000-305885 | 11/2000 |
| JP | 2001-298467 A | 10/2001 |
| JP | 2002-199461 A | 7/2002 |
| JP | 2002-232435 | 8/2002 |
| JP | 2003-163668 | 6/2003 |
| JP | 2003-198564 A | 7/2003 |

OTHER PUBLICATIONS

Japanese Office Action dated Sep. 11, 2009, in corresponding Japanese Application No. 2004-119259.

* cited by examiner

| TERMINAL ADDRESS /501 | SSID /502 | MODE /503 | RESULT OF FUNCTION SEARCH /504 |
|---|---|---|---|
|  | ABCD | INFRASTRUCTURE | INVALID |
|  | EFGH | AD-HOC | SUCCESSFUL |
|  | IJKL | AD-HOC | UNRETRIEVED |
|  | MNOP | AD-HOC | UNRETRIEVED |
|  |  |  |  |
|  |  |  |  |

COMMUNICATION CONTROL METHOD AND WIRELESS COMMUNICATION APPARATUS

TECHNICAL FIELD

This invention relates to a network system in which it is possible for a wireless communication apparatus (a mobile station) to communicate in a communication mode with the intermediary of a master station (base station) and a communication mode without the intermediary of a master station (base station). More particularly, the invention relates to a network system in which a digital camera and a printer, for example, are connected by a wireless LAN system, which is compliant with IEEE 802.11, having different network configurations, namely an infrastructure mode and an ad-hoc mode.

BACKGROUND ART

A communication method that provides a first communication mode (infrastructure mode), in which wireless communication is performed between terminals via a master station, and a second communication mode (ad-hoc mode), in which data is sent and received directly between terminals, is defined by the IEEE 802.11 standard.

In the IEEE 802.11 standard, the frequency band utilized in communication is divided into 14 channels to thereby define a plurality of channels. Wireless communication terminals that utilize a common channel are capable of communicating with each other. An SSID (Service Set ID), which is an identifier for identifying the network, is specified. All wireless communication terminals retain a predetermined SSID and thus can identify the network.

A communication terminal that performs wireless communication in accordance with IEEE 802.11 (this terminal will be referred to simply as a "wireless communication terminal" below) transmits a beacon frame at prescribed timing. The beacon frame includes a channel ID that indicates the channel currently operating, the SSID of the network to which the apparatus belongs, and the communication mode. By passive or active scanning, a wireless communication terminal finds a wireless communication terminal with which it is to communicate. In passive scanning, for example, a beacon frame that includes an SSID identical with the terminal's own SSID is searched for by scanning the radio signal of each channel. A wireless communication terminal that has received the applicable beacon frame decides upon the channel that corresponds to the channel identifier contained in this beacon frame, or the channel that received this beacon frame, as the channel used in its own communication.

In active scanning, on the other hand, a wireless communication terminal broadcasts a frame, which is referred to as a "probe request", on each channel. In response, another wireless communication terminal that has received the probe request transmits a frame, which is referred to as a "probe response", to the wireless communication terminal that is the source of the probe request. The probe response includes the ID of the channel currently operating on the wireless communication terminal, the SSID and the communication mode. The wireless communication terminal that has received the probe response decides upon the channel that corresponds to the channel identifier contained in the probe response included in the SSID identical with that of this wireless communication terminal, or the channel that received the probe response, as the channel used in its own communication.

An autonomous distributed coordination method referred to as CSMA/CA and a centralized control method referred to as polling have been specified as access control methods in the infrastructure mode according to IEEE 802.11. On the other hand, in the ad-hoc mode, the access control method is such that only the autonomous distributed coordination method is specified. Owing to distributed control in the ad-hoc mode, data is sent and received directly between terminals. Among all terminals participating in communication at beacon transmission time decided by the beacon interval, at least one terminal transmits a beacon frame in the ad-hoc mode.

In the ad-hoc mode, a communication link is established between terminals if the channels used in communication between the terminal become the same, without the sending and receiving of an authentication frame and without the sending and receiving of an association request/association response.

Many methods of switching between the infrastructure mode and ad-hoc mode have been proposed heretofore. A method of changing over the mode when the processing capability of an access point no longer has any leeway is described in the specification of Japanese Patent Application Laid-Open No. 08-307934. The specification of Japanese Patent Application Laid-Open No. 11-252114 describes a method in which each station (wireless communication terminal) retains a list of stations capable of transferring data in the ad-hoc mode, with data being transmitted in the ad-hoc to stations in the list and in the infrastructure mode to stations not in the list. A method of changing over the access point depending upon the data rate of a mobile terminal is described in the specification of Japanese Patent Application Laid-Open No. 2000-209234. A method of changing over the access point in accordance with load information contained in a beacon is described in the specification of Japanese Patent Application Laid-Open No. 2001-298467. A method of changing over mode using the average frame size of a data frame as a trigger is described in the specification of Japanese Patent Application Laid-Open No. 2003-198564. A method of monitoring data reception in both communication modes and performing communication in the mode in which data was received is described in the specification of Japanese Patent Application Laid-Open No. 2002-199461.

Further, a method of changing an interval at which beacon scanning is performed has been proposed as a method of searching efficiently for a terminal to which a connection is to be made (see the specification of Japanese Patent Application Laid-Open No. 10-084572). However, this specification makes no mention of changeover of the communication mode.

In order for a user of a wireless communication terminal compliant with IEEE 802.11 to connect this terminal to the Internet, the access point is connected to the Internet in advance. The wireless communication terminal is connected to the network in the infrastructure mode.

In a network of this kind, a first wireless communication terminal that belongs to the same network (same service set) attempts to transmit data to a second wireless communication terminal that is performing communication in the infrastructure mode. In this case, the access point receives the data from the first wireless communication terminal temporarily and re-transmits it to the second wireless communication terminal. As a consequence, the sending and receiving of data takes time. Since both the first wireless communication terminal and the second wireless communication terminal can be connected to the Internet via access points, sufficient security measures must be taken with regard to illegal penetration from the Internet and leakage of information to the Internet.

Accordingly, performing communication upon changing over to the ad-hoc mode by a method of the kind illustrated in the prior art even in a case where communication is being performed in the infrastructure mode has been considered.

However, even if data can be sent and received in a link layer, the sending and receiving of meaningful data cannot be performed upon changing over the communication mode from the infrastructure mode to the ad-hoc mode unless there is data interchangeability with higher layers, namely the IP layer, transport layer or application layer.

DISCLOSURE OF INVENTION

An object of the present invention is to provide a communication control method, as well as a wireless communication apparatus for implementing this method, whereby even if a wireless communication apparatus is a wireless communication apparatus that does not possess a sophisticated communication security function, communication can be carried out upon changing over the communication mode in conformity with the functions of the communicating party, and whereby it is possible to perform data communication that assures compatibility with the data in a higher layer.

According to the present invention, the foregoing object is attained by providing a communication control method for controlling communication between wireless communication apparatuses that are capable of communicating wirelessly in a first communication mode in which communication is performed via a base station and a second communication mode in which communication is performed with a wireless communication apparatus directly, wherein if, during communication by a first wireless communication apparatus in the first communication mode, the first wireless communication apparatus receives a signal from a second wireless communication apparatus giving notification of the existence of the second wireless communication apparatus, the first wireless communication apparatus is connected to the second wireless communication apparatus utilizing information such as a network identifier contained in the signal received. Between the first wireless communication apparatus and the second wireless communication apparatus, it is determined whether a function desired by at least the second wireless communication apparatus is possessed by the first wireless communication apparatus. If the first wireless communication apparatus possesses the desired function, then data is transmitted from the second wireless communication apparatus to the first wireless communication apparatus.

In accordance with the present invention, it is possible to change over the communication mode depending upon the function possessed by the communicating party, and it is possible to perform high-speed, safe data communication with another wireless communication apparatus having compatibility.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

First Embodiment

System Configuration

Figure 1:
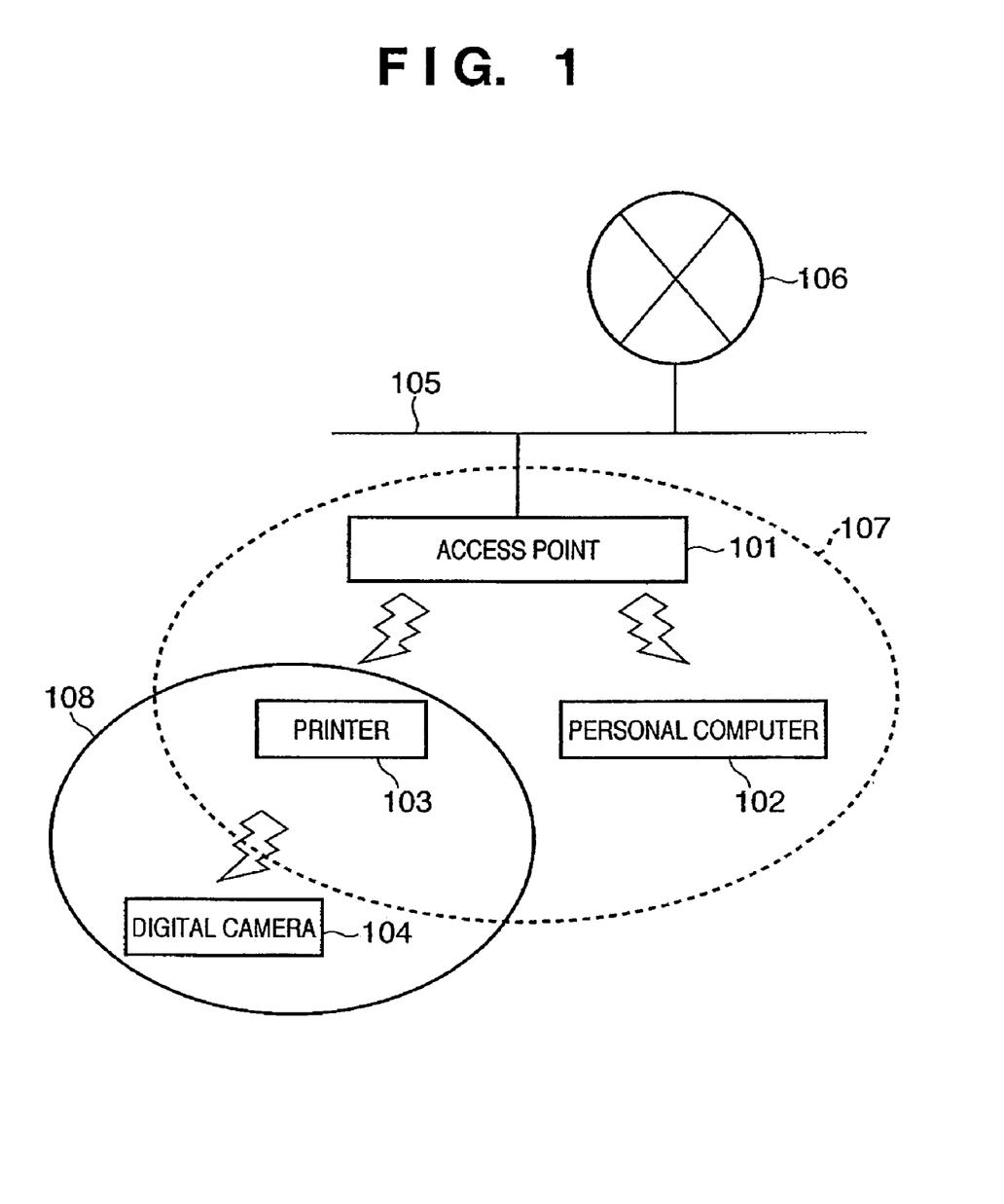
FIG. 1 is a schematic view for describing the configuration of a system applicable to the present invention.

FIG. 1 is a schematic view useful in describing the form of a network system to which the present invention is applied. The network system of FIG. 1 comprises an access point 101, a personal computer 102, a printer 103, a digital camera 104, a wired line 105 and the Internet 106. The access point 101, which is a central control apparatus in the infrastructure mode (also referred to as a "first communication mode"), controls the communication of each connected device and relays the data transmitted by each device. The access point 101 is connected to the Internet 106 via a wired line. The personal computer 102 has a communication function for performing communication in the first communication mode with the Internet and other terminals via the access point 101. The printer 103, which has a communication function, is capable of printing data that has been received via the access point in the infrastructure mode and data that has been transmitted from a directly connected terminal in the ad-hoc mode (also referred to as a "second communication mode"). The digital camera 104, which has a communication function, has a printing function as well for transmitting image data to the printer 103 and causing the printer to print the image data in the ad-hoc mode. The wired line 105 is a local-area network connected to the access point 101. Further, a zone 107 represents the area in which communication in possible in the infrastructure mode, and a zone 108 represents the area in which communication is possible in the ad-hoc mode.

The access point 101, personal computer 102, printer 103 and digital camera 104 perform communication in accordance with IEEE 802.11. In particular, the access point 101, personal computer 102 and printer 103 perform communication in the first communication mode, namely the infrastructure mode. Further, when the printing function possessed by the digital camera 104 is started up, the digital camera 104 causes the communication function to start up in the second communication mode, namely the ad-hoc mode. Once the connection of the printer 103 to the access point 101 in the infrastructure mode is severed, the printer 103 is connected to the digital camera 104 in the ad-hoc mode.

The connection in the ad-hoc mode is used between the printer 103 and the digital camera 104, which exchange information, such as the types of data transmission functions each other possesses, and search for a data transmission function each other shares. If there is a data communication function common to both, then the digital camera 104 performs a data transmission using this function. The printer 103 executes printing of the data received. It should be noted that a function referred to here also includes a protocol, by way of example. A wireless communication terminal (a wireless communication apparatus) in this embodiment communicates in accordance with IEEE 802.11 with regard to a protocol of the physical layer or link layer, and a higher layer uses TCP/IP. Accordingly, the protocol that should be verified as being the common protocol is a protocol of the application layer, which specifies the format of the data that is to be printed and the procedure of data exchange. The printer 103 and digital camera 104 exchange information indicative of each other's functions to check whether the data format for printing and the procedure for data exchange are in accordance with the same protocol. In this embodiment, a function-search frame is transmitted from one device to the other. If the side that has received the function-search frame can interpret the frame, then this side transmits a response indicative of this fact back to the transmitting side. As a result, the transmitting side is capable of verifying that the receiving side has the function searched for by the function-search frame. The search for the function based upon the function-search frame can be conducted with various functions as the targets.

Figure 2:
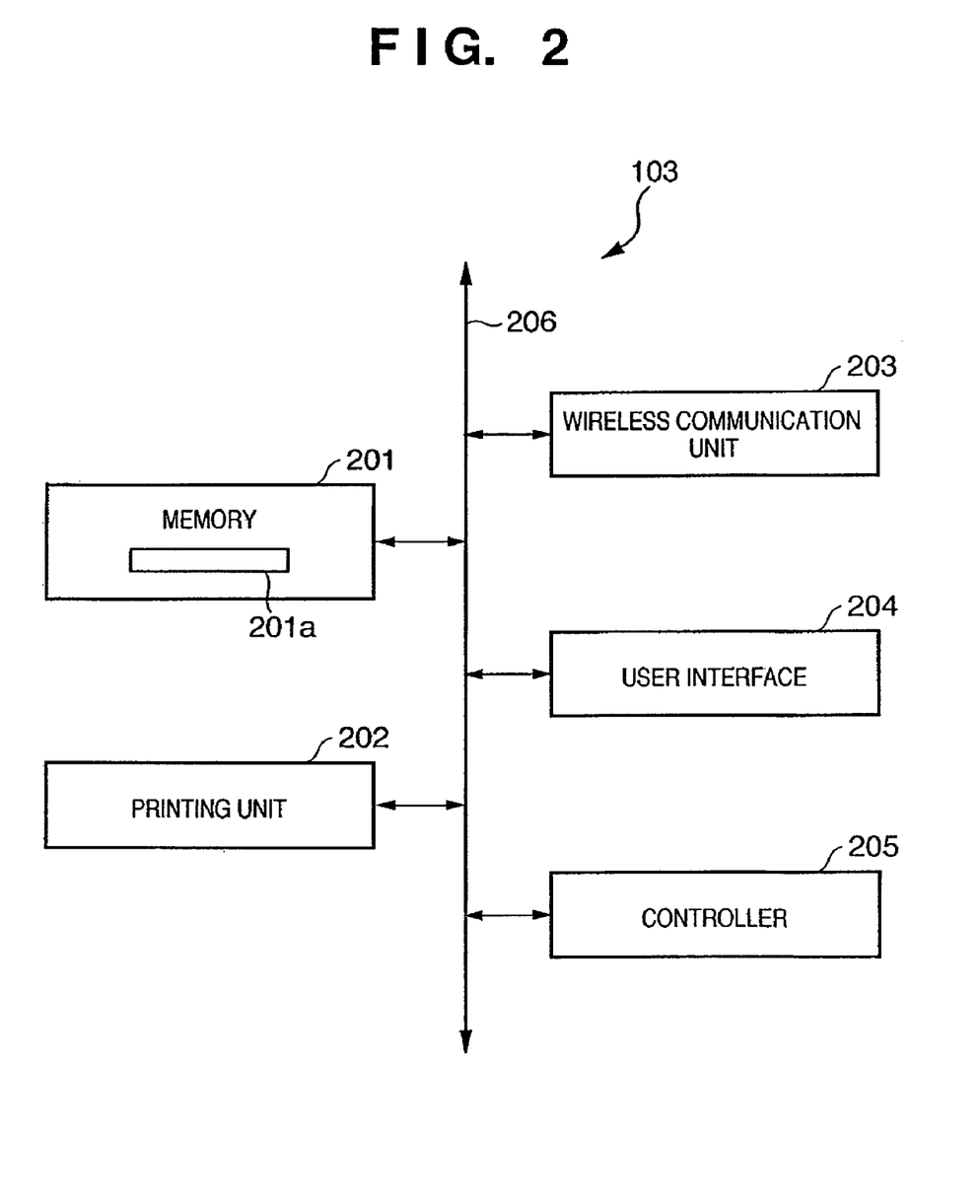
FIG. 2 is a block diagram illustrating the structure of one example of a printer equipped with a communication according to the present invention.

FIG. 2 is a block diagram illustrating the structure of one example of the printer 103 equipped with a communication according to the present invention. The printer 103 in FIG. 2 has a memory 201, a printing unit 202, a wireless communication unit 203, an user interface 204, a controller 205 and a bus 206. The memory 201 is used in order to store data received by the wireless communication unit 203 and a function table 201a in which are described the SSID and communication mode, etc., contained in a beacon received by the wireless communication unit 203. The printing unit 202 expands the data, which has been stored in memory 201, into a printable format and prints the data on a printing medium such as paper. The wireless communication unit 203 sends and receives data in the infrastructure mode or ad-hoc mode compliant with IEEE 802.11 and stores received data in the memory 201. The user interface 204 comprises an input unit such as a keyboard for allowing the user to enter various settings and commands such as power on/off, and a display unit that notifies the user of the status of settings and the status of operation. The controller 205 is a central processing unit for coordinating and controlling these structural elements. The structural elements are connected by the bus 206 so that the sending and receiving of data among the devices is achieved. It should be noted that it is permissible to adopt an arrangement in which the transmission output of the wireless communication unit 203 can be altered by control exercised by the controller 205.

Figure 3:
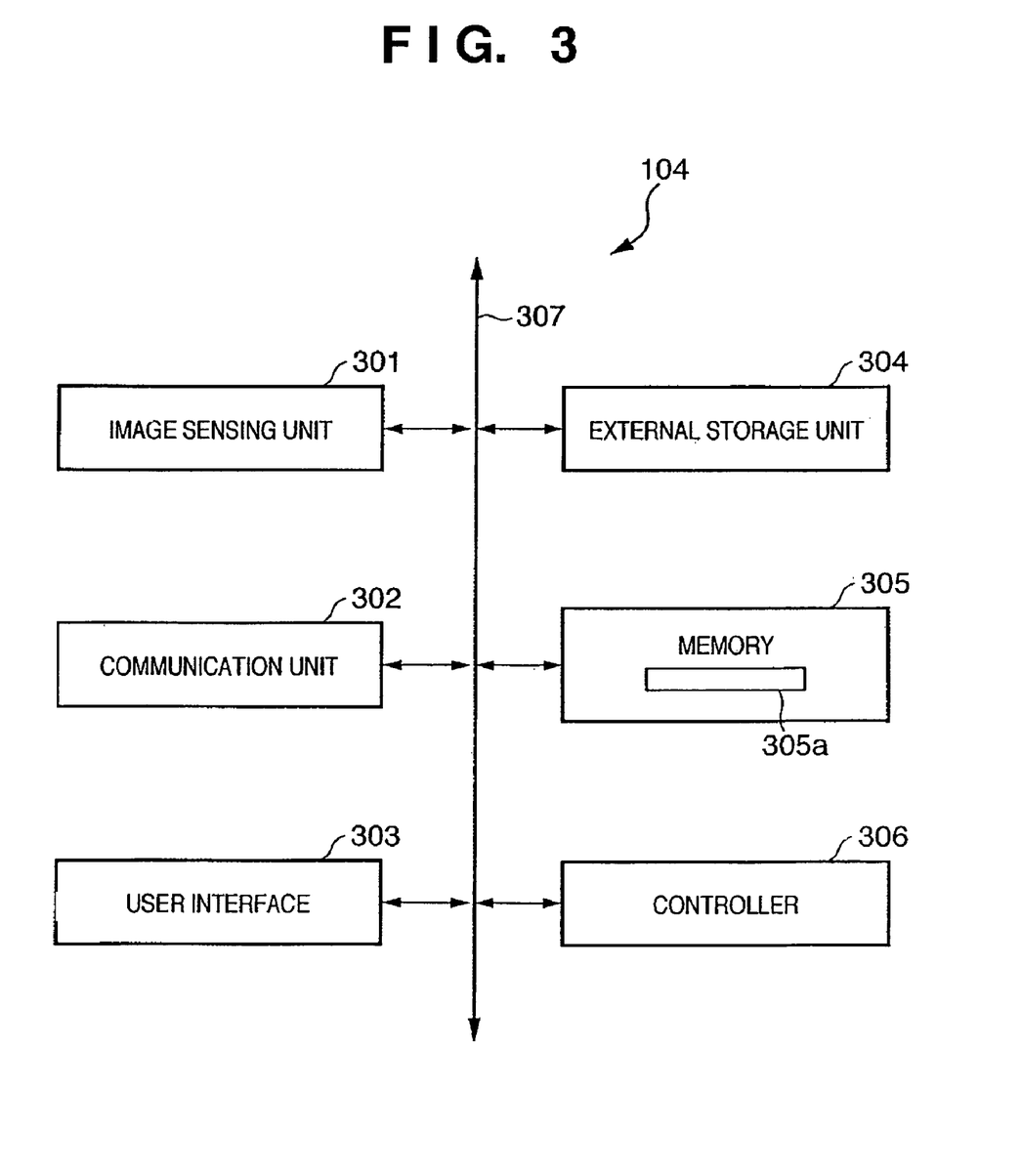
FIG. 3 is a block diagram illustrating the structure of one example of a digital camera equipped with a communication function according to the present invention.

FIG. 3 is a block diagram illustrating one example of the digital camera 104 equipped with a communication function according to the present invention. The digital camera 104 has an image sensing unit 301 for inputting an image, a communication unit 302, a user interface 303, an external storage unit 304, a memory 305, a controller 306 and a bus 307. The communication unit 302 transmits an image and receives various information by performing wireless communication. The user interface 303 includes an input unit such as buttons and switches by which the user enters commands to the digital camera 104, and an output unit, which comprises a finder and liquid crystal display screen, etc., for displaying images and character information such as menus. The external storage unit 304 is constituted by a memory card such as a compact flash card for recording an image captured by the image sensing unit 301, and an access device for accessing the memory card. The memory 305 records a captured image temporarily before it is recorded in the external storage unit 304 and records temporary data such as control data. The controller 306 coordinates and controls these structural elements. The structural elements are connected by the bus 307 and are capable of exchanging data. Also stored in the memory 305 is a function table 305a, etc., in which are described an SSID and communication mode, etc., contained in a beacon that has been received by the communication unit 302. It should be noted that it is permissible to adopt an arrangement in which the transmission output of the communication unit 302 can be altered by control exercised by the controller 306.

<Printer Operation>

Figure 4:
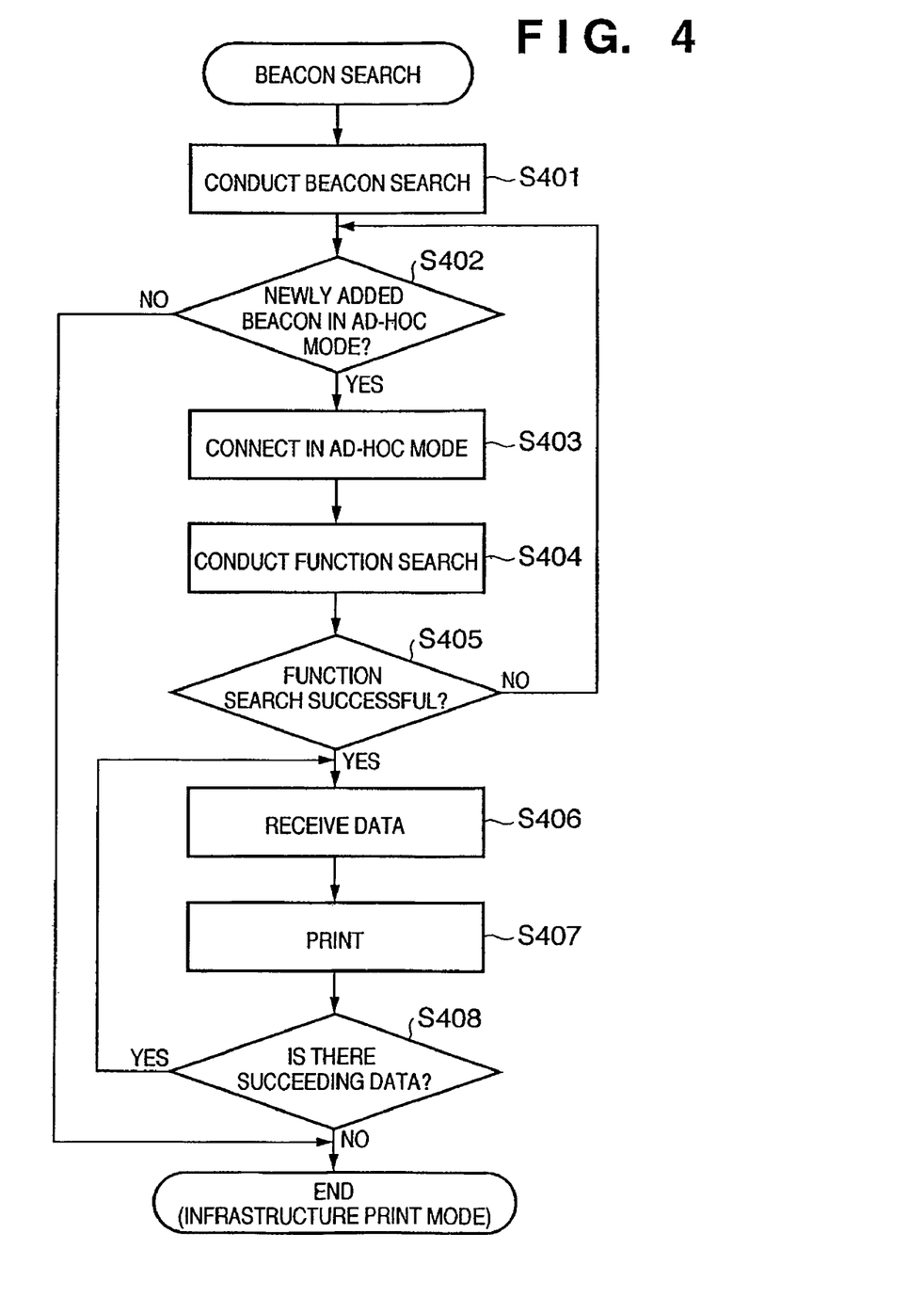
FIG. 4 is a flowchart illustrating one example of operation of a printer equipped with a communication function according to the present invention.

One example of operation of the printer equipped with the communication function according to the present invention will be described with reference to the flowchart shown in FIG. 4. The processing of FIG. 4 is executed by the controller 205 in FIG. 2. The printer 103 with the communication function according to this embodiment usually operates in the infrastructure print mode. The infrastructure print mode is the operating mode of the printer in the infrastructure mode. The printer 103 with the communication function performs printing in a case where data, which has been transmitted from the personal computer 102 or from a terminal connected to the wired line 105 in FIG. 1, is received via the access point 101. The printer 103 conducts a search for a beacon at a prescribed period while operating in the infrastructure print mode. The procedure shown in FIG. 4 is a processing procedure for conducting a beacon search at the prescribed period. This procedure is launched using the time-out of a timer, for example, as a trigger.

If the processing of FIG. 4 is launched upon elapse of the prescribed period, a beacon scan is performed at step 401. In the beacon search, a beacon, regardless of whether it is a beacon of the infrastructure mode or a beacon of the ad-hoc mode, becomes the object of the search irrespective of the communication mode on at least one channel. If it finds a beacon, the printer 103 stores the function table 201a in the memory 201. The function table 201a contains the SSID and communication mode, which are included in one beacon that has been found, and the terminal address of the beacon transmission source as a set. The function table 201a is registered with regard to all beacons that have been found.

If the beacon search is completed, control proceeds to step 402. Here the printer searches the function table 201a and shifts to step 403 if it finds a beacon of the ad-hoc mode that has been newly added to the function table 201a. At step 403 the printer 103 is connected in the ad-hoc mode to the wireless communication terminal transmitting the beacon. At this time the printer 103 reads from the function table 201a the SSID contained in the beacon from the wireless communication terminal (e.g., a digital camera) and communicates with the terminal using this SSID. It should be noted that when the printer is connected to the wireless communication terminal transmitting the beacon, information for establishing the connection may be saved in the memory 201 if the connection has been made to the network in the infrastructure mode, and the connection in the infrastructure mode may be severed temporarily. By way of example, the channel number used by the access point is included as information saved.

If the connection succeeds at step 403, control proceeds to step 404, at which a function search is conducted to inquire about the functions possessed by the connected wireless communication terminal and receive notification of the function possessed by the printer 103 equipped with the communication function. As one example of the function search, the printer 103 sends the wireless communication terminal of the communicating party a function-search request frame that contains information representing the functions possessed by this printer.

A wireless communication terminal that has received the function-search request frame from the printer 103 and that has correctly interpreted this frame and the information representing the functions of the printer 103 contained in the frame transmits a function-search response frame, which indicates the fact that interpretation could be achieved, to the printer 103 that transmitted the function-search request frame. In order to interpret information representing a function, a terminal having a certain function stores a code, which represents this function, in a memory or the like beforehand. If the function-search frame is received, then this terminal compares the stored code representing the function with information representing the function contained in the function-search request frame and determines whether the two agree, thereby allowing interpretation to be achieved. If agreement is found, then the terminal responds on the grounds that agreement could be achieved. Further, a terminal that cannot interpret the function-search request frame per se responds to this effect or does not respond at all. In this embodiment, a terminal capable of interpreting the function-search frame of the printer 103 and of responding accordingly is the digital camera 104.

Upon receiving the function-search response frame, the printer 103 stores the result of the function search contained in the function-search response frame (the result is information indicating whether the search succeeded with regard to a fixed function, this being information indicating the function possessed by the terminal on the receiving side) in the function table 201a. The result of the function search is stored in correspondence with the terminal address of the wireless communication terminal that transmitted the function-search response frame.

Alternatively, it may be so arranged that the printer 103 broadcasts the function-search request frame and waits for the function-search response frame from a wireless communication terminal that has received and interpreted the broadcast frame. In this case, registration in the function table 201a is performed in a manner similar to that described above.

It is determined at step 405 whether the function search has ended and the connected wireless communication terminal has the required function. If it is confirmed at step 405 that the terminal has the required function, then control proceeds to step 406. Data is received in the ad-hoc mode at step 406 and printing of the received data is performed at step 407. For example, a print protocol that specifies a data format or message sequence for transmitting data from the digital camera 104 to the printer 103 and printing the data is a function necessary for the printer 103 and digital camera 104 in order to implement printing in the ad-hoc print mode.

The printer receives the data in accordance with the print protocol at step 406 and prints the data at step 407. Control proceeds to step 408 at the completion of printing. It is determined at step 408 whether print data still remains. If print data remains, control returns to step 406, the data is received and printing is performed. One example of a method of determining whether print data remains is as follows: If the sending and receiving of a printing-complete frame is contained in the message sequence of the print protocol, then end of printing, i.e., the fact that no print data remains, may be determined when the printer 103 has received the printing-complete frame from the digital camera 104. Further, if print data is not received within a prescribed period of time following the receipt of print data, it may be determined that no print data remains even though a printing-complete frame has not been received.

If a new beacon of the ad-hoc mode cannot be found at step 402, or if printing is completed at step 408, communication in the ad-hoc mode is terminated and the printer operates in the infrastructure mode.

Further, if the function search of the wireless communication terminal of the other party fails at step 405, control returns to step 402. On the basis of the content of the function-search response frame received by the printer 103, it is determined that the function search has failed if it is confirmed that the connected wireless communication terminal does not have the required function or if the function-search response frame cannot be received even upon elapse of a prescribed period of time. In this case, control returns to step 402 and the printer 103 is connected to the corresponding terminal of the other party at step 403 using the SSID contained in the next ad-hoc-mode beacon that has been newly added to the function table 201a. A case where it has been verified that the connected wireless communication terminal does not have the required function based upon the content of the received function-search response frame signifies a case where the wireless communication terminal that has transmitted the function-search response frame can interpret the function-search frame but cannot interpret the information representing the function contained in this frame.

Wireless transmission outputs that differ from each other may be used at the time of a connection in the ad-hoc mode and at the time of a connection in the infrastructure mode. For example, when the connection is made in the ad-hoc mode at step 403, the wireless transmission output is made smaller than that in the infrastructure mode. As a result, whereas it is possible to make a connection to a remotely installed access point in the infrastructure mode, a wireless communication terminal (digital camera 104) capable of performing printing using the printer 103 is limited to one having a comparatively short distance from the printer in the ad-hoc mode (i.e., one located in a service area reached by the radio waves). That is, if a service set includes a plurality of printers, a printer that is closer can be used. As a result, contention between terminals attempting to use a printer can be prevented. This is useful in shortening processing time and in improving processing efficiency. In addition, the fact that a nearby printer is used is highly convenient for the user.

Figure 5:
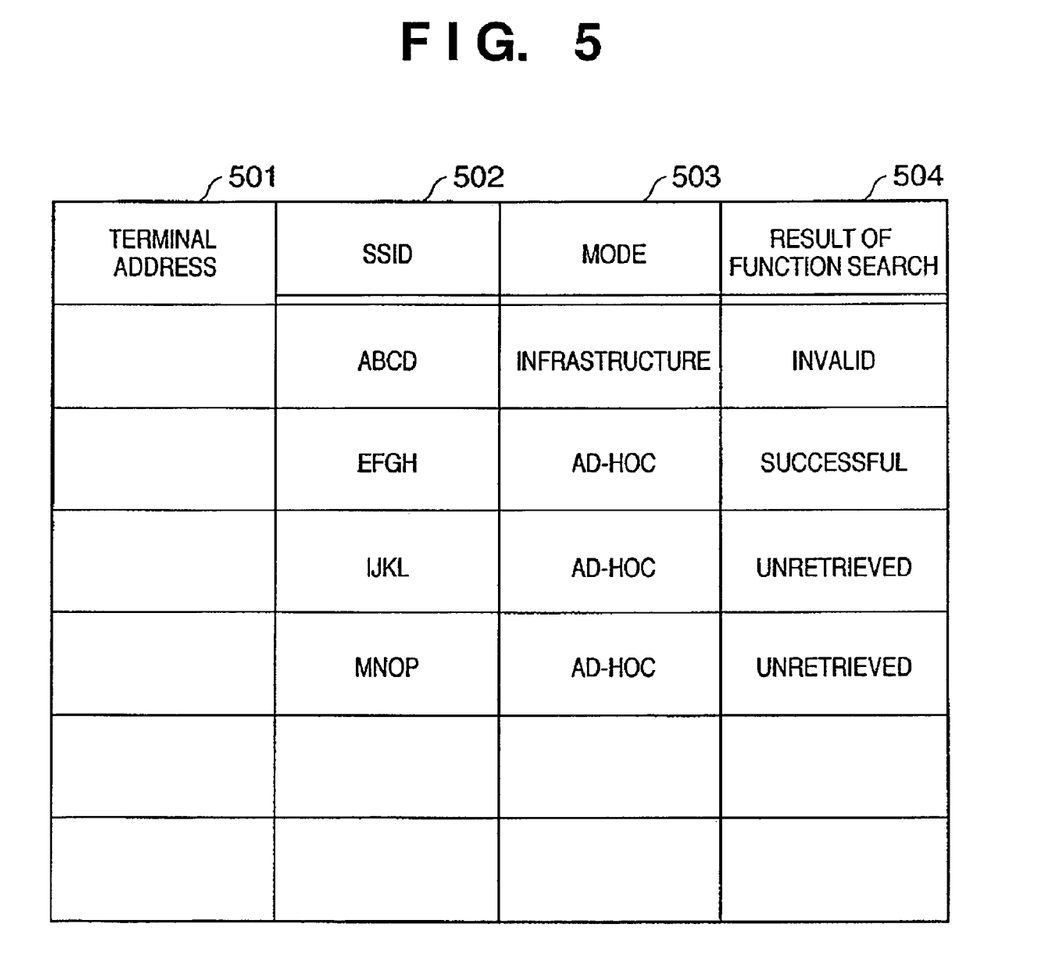
FIG. 5 is schematic diagram illustrating one example of a table held by a printer equipped with a communication function according to the present invention.

FIG. 5 is a diagram illustrating an example of the function tables 201a, 305a. An address 501, SSID 502, communication mode 503 and function-search result 504 of a wireless communication terminal are stored as a set in the function table. At step 401 in FIG. 4, whether the terminal address included in a found beacon frame has already been registered in the function table is examined. If the terminal address has not been registered in the function table, then the address is added to the function table. When the terminal address is added, a value indicating "invalid" is recorded as the function-search report with regard to a beacon of the infrastructure mode, and a value indicating "unretrieved" is recorded as the function-search report with regard to a beacon of the ad-hoc mode. Further, even if there is a terminal address that has already been registered in the function table, the printer 103 updates the relevant entry with new content at step 401 in FIG. 4 if there is a change in the content. If the mode after updating is the ad-hoc mode, then a function search is conducted again using the function-search report concerning this terminal as the value of "unretrieved".

A beacon indicating an SSID for which the function-search result is "unretrieved" is judged to be a new beacon at step 402 in FIG. 4. At step 403, a connection is made to the wireless communication terminal that was the transmission source of the new beacon. At step 405, the function-search result 504 corresponding to the SSID 502 (or terminal address 501) of the wireless communication terminal for which the function search has been completed is updated to a value indicating that the function search has been completed. A value indicating "succeeded" is registered if the result of the search is indicative of success, and a value indicating "failed" is registered if the result of the search is indicative of failure.

<Operation of Digital Camera>

Figure 6:
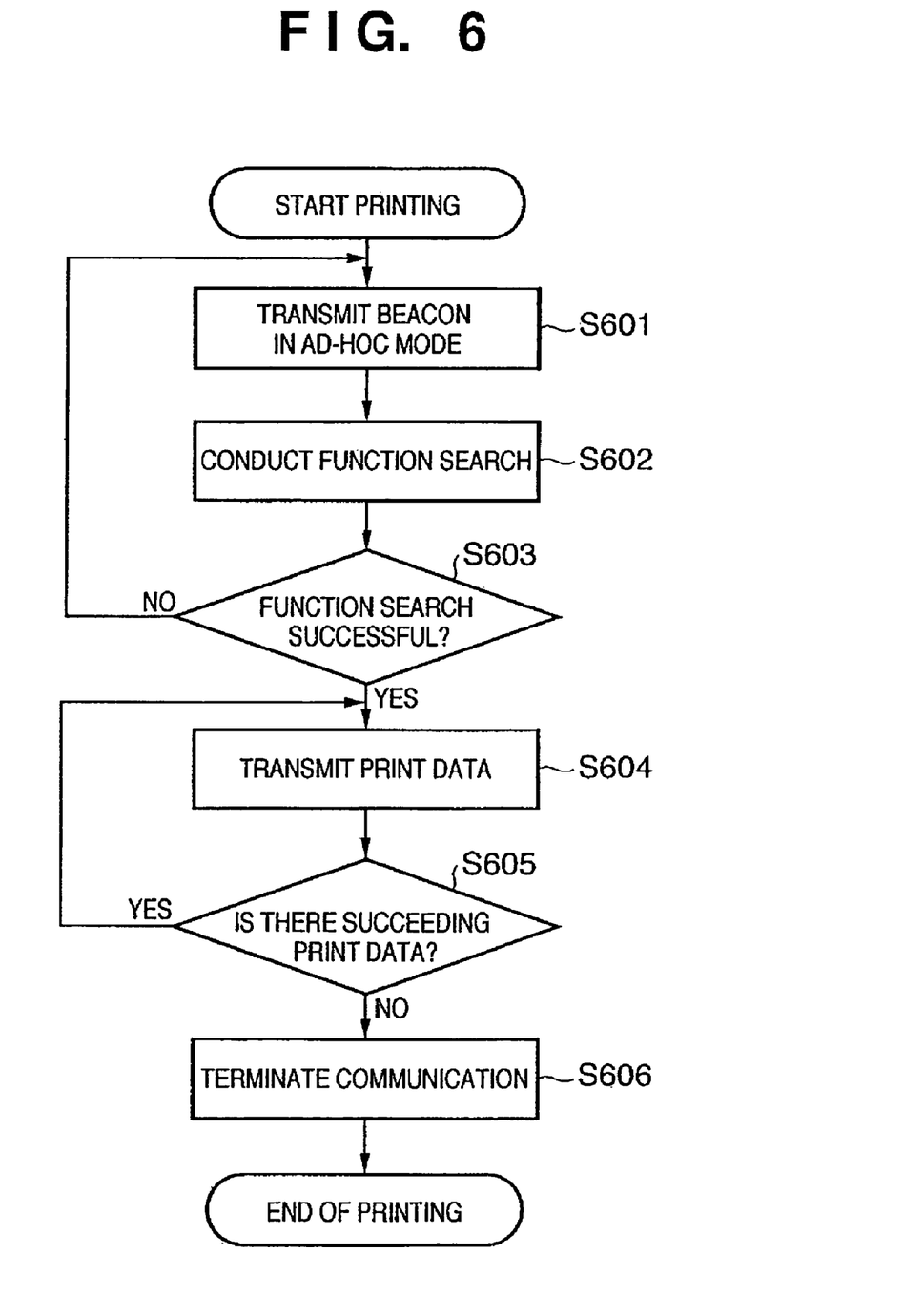
FIG. 6 is a flowchart illustrating one example of operation of a digital camera equipped with a communication function according to the present invention.

FIG. 6 is a flowchart illustrating an example of operation of the digital camera 104 equipped with a communication function according to the present invention. In FIG. 6, the digital camera 104 starts communicating in the ad-hoc mode and transmits a beacon frame at step 601 when the user enters a print-start command. The SSID of which notification is given by the beacon may be one that has been set by the user in advance, one that has been set statically in the digital camera or one that has been set by some other method.

When the printer 103 is connected to the digital camera 104 in the ad-hoc mode at step 403 in FIG. 4, control proceeds to step 602 in FIG. 6. At this step the digital camera 104 conducts a function search similar to that at step 404 in FIG. 4. Accordingly, the function table 305a of FIG. 5 also is created. What differs, however, is that the communicating partner of the digital camera 104 is not unspecified but is the printer 103.

If the result of the function search at step 603 is the discovery of a printer having the function that is the object of the search, the fact that processing succeeded is registered in the function table 305a and control proceeds to step 604. On the other hand, if a printer having the function that is the object of the search cannot be found, then control returns to step 601 and the digital camera waits, while periodically transmitting a beacon, until a connection to another printer is made.

Data is transmitted in the ad-hoc print mode at step 604. For example, a function that is the object of the search at step 602 is a printing protocol for transferring data from the digital camera 104 to the printer 103 and causing the printer to print the data. The digital camera transmits the data to the printer 103 and causes the printer to execute printing at step 604 in accordance with the printing protocol that the printer 103 has been confirmed to possess. If succeeding print data is found to exist at step 605, then the digital camera repeats step 604. If there is no succeeding print data, then control proceeds to step 606. Here the digital camera terminates communication with the printer as by terminating communication in the ad-hoc mode.

If a connection to the printer 103 is not established at step 601 even upon elapse of a prescribed period of time, the digital camera may notify the user interface 303 of timeout and terminate processing.

Thus, the digital camera 104 and printer 103 are connected in the ad-hoc mode. Since the digital camera 104 transmits print data to the printer 103 in the ad-hoc mode, leakage of data can be prevented. Further, a state in which printing can be performed is attained merely by moving the digital camera 104 or printer 103 into each other's service areas. This greatly improves convenience when an image from the digital camera is printed by the printer. Furthermore, since the camera and printer search for each other's functions and perform communication that is limited to the partner for which the search succeeded, compatibility is assured and data processing such as printing can be executed reliably.

The present invention has been described with regard to a digital camera and printer in this embodiment. However, as long as the device has a wireless communication function, the present invention is applicable thereto. For example, if the printer is made a general-purpose personal computer, the digital camera is made a portable information processor (PDA), the print data is data to be synchronized and the data is transmitted, data synchronization between the personal computer and PDA can be achieved in simple fashion. The same holds true with regard to other devices as well.

First Modification of Embodiment

The printer 103 may temporarily delete the function table 201a of FIG. 5 immediately before the beacon search is started at step 401 and may construct the function table 201a afresh. In this case, it is preferred that once communication in the ad-hoc mode has started, the printer 103 conduct a function search with regard all discovered terminals that are the transmission sources of beacons in the ad-hoc mode. The reason for this is that since the printer 103 processes a print request from one digital camera in the processing path illustrated in FIG. 4, there is the possibility that there will be a wireless communication terminal (digital camera) for which a print request is not processed or a wireless communication terminal (digital camera) that will be left standing for a prolonged period of time. Accordingly, in a case where it is determined at step 408 in FIG. 4 that there is no succeeding data, control returns to step 404 and a function search is executed with respect to terminals for which the function search is "unretrieved" in the function table. Processing from step 405 onward is then executed.

By adopting this arrangement, even if a print request is output repeatedly from one digital camera, the print request can be processed reliably. Further, a print request from another digital camera also can be processing reliably.

Second Modification of Embodiment

A function search is initiated at step 404 in FIG. 4 from the printer 103 equipped with the communication function. On the other hand, a connection in the ad-hoc mode may be sensed, as by receiving a frame that is exchanged at the time of a connection at a terminal connected to the printer 103, and this may serve as a trigger to start the function search.

Further, instead of a beacon-frame search at step 401, a beacon information request and response sequence may be performed. In this case, the printer 103 transmits a beacon-information request frame that requests transmission of at least an SSID and communication mode. A wireless communication terminal that has received this beacon-information request frame transmits a beacon-information response frame, which contains at least an SSID and communication mode, to the terminal (printer 103) that transmitted the beacon-information request frame. The printer 103 that has received the beacon-information response frame creates the function table 201a using the terminal address and SSID contained in this frame.

In this case, when the digital camera 104 has received the beacon-information request frame for requesting transmission of at least the SSID and communication mode, at step 601 in FIG. 6 the camera transmits the beacon-information response frame, which contains at least the SSID and communication mode, to the terminal that was the source of transmission of the beacon-information request frame.

Second Embodiment

Figure 8:
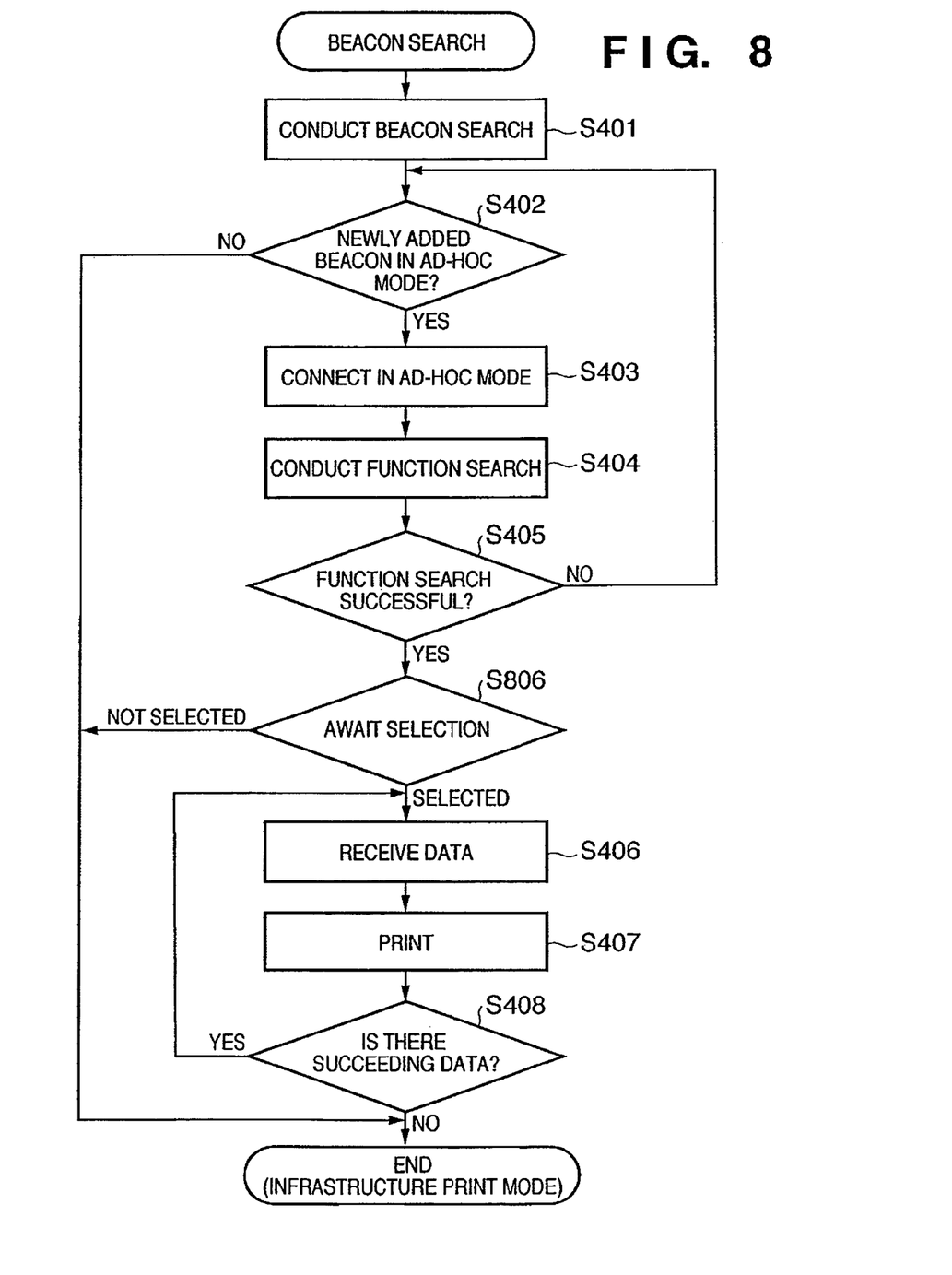
FIG. 8 is a flowchart illustrating another example of operation of a printer equipped with a communication function according to the present invention.

Reference will now be had to the flowchart of FIG. 8 to describe another example of operation of printer 103 equipped with a communication function according to the present invention. The procedure of FIG. 8 is executed by the printer 103 in this embodiment instead of the procedure of FIG. 4 according to the first embodiment. In the flowchart shown in FIG. 8, steps identical with those of the embodiment shown in FIG. 4 are designated by like step numbers.

<Printer Operation>

The printer 103 with the communication function according to this embodiment usually operates in the infrastructure print mode. In the infrastructure print mode, the printer 103 performs printing in a case where data, which has been transmitted from the personal computer 102 or from a terminal connected to the wired network 105 in FIG. 1, is received via the access point 101. Further, the printer 103 conducts a search for a beacon at a prescribed period. In the beacon search, all beacons are searched regardless of whether a beacon is a beacon of the infrastructure mode or a beacon of the ad-hoc mode on at least one channel. If it finds a beacon, the printer 103 stores a table in the memory 201. The table contains at least an SSID, communication mode and function-search result, described later, in the form of a set.

If the processing of FIG. 8 is launched upon elapse of the prescribed period, a beacon scan is performed at step 401. Since the processing up to step 405 is the same as that in FIG. 4, this processing need not be described again.

If the function search ends and it is confirmed that the connected terminal has the desired function at step 405, the printer 103 waits to be selected by the connected terminal at step 806. The selection is performed by sending and receiving a print request frame from the digital camera 104, by way of example. If the printer 103 has been selected, i.e., if it has received a print request frame, control proceeds to step 406, at which the printer executes processing such as the receiving and printing of data. Processing from step 406 onward is the same at that of FIG. 4. Further, in a case where the printer 103 is not selected by a terminal to serve as a communication partner, e.g., in a case where a fixed period of time passes without a print request frame being received, the printer terminates processing and returns to the infrastructure mode.

<Operation of Digital Camera>

Figure 7:
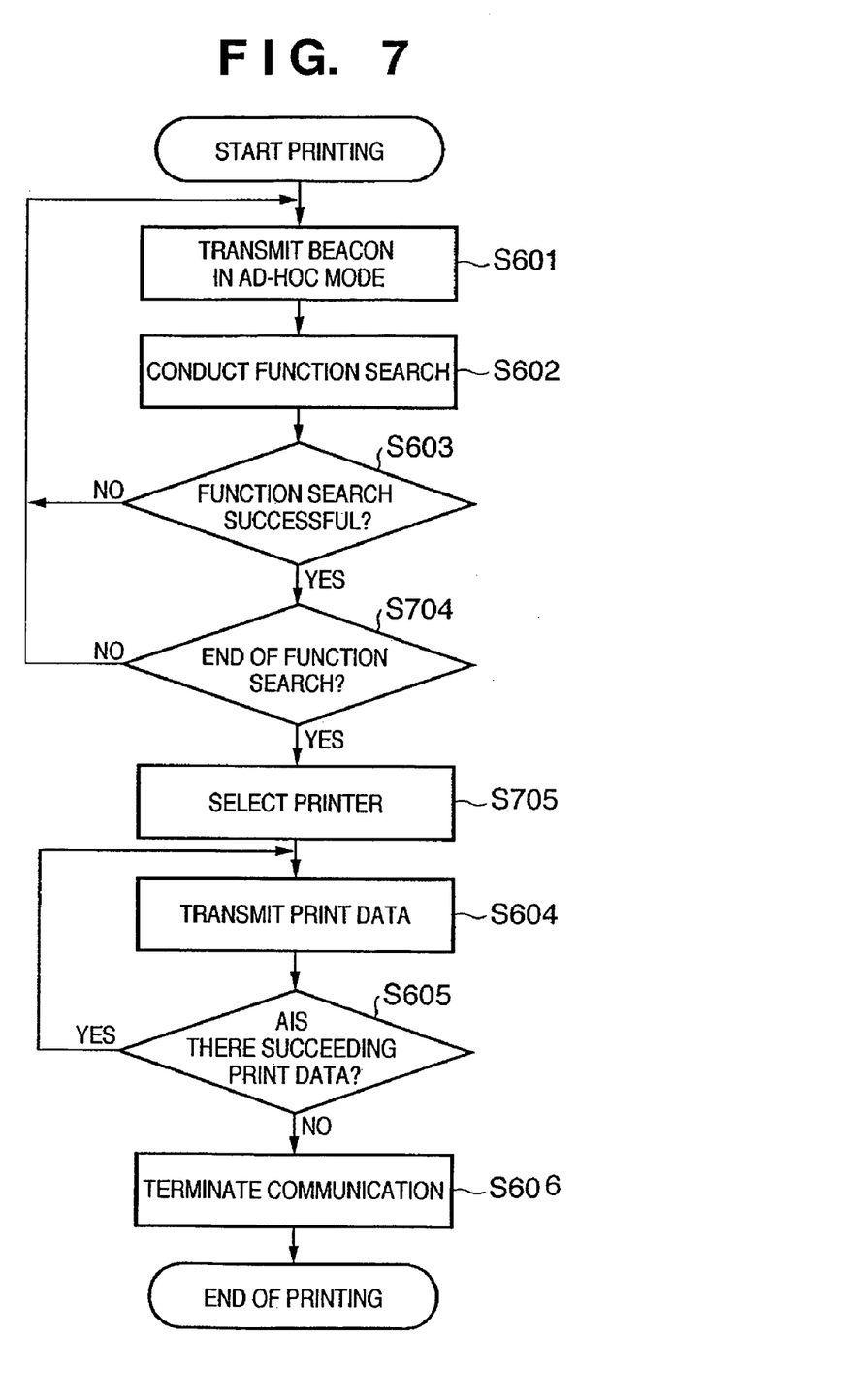
FIG. 7 is a flowchart illustrating another example of operation of a digital camera equipped with a communication function according to the present invention.

FIG. 7 is a flowchart illustrating an example of operation of the digital camera 104 equipped with a communication function according to the present invention. The procedure of FIG. 7 is executed by the digital camera 104 in this embodiment instead of the procedure of FIG. 6 according to the first embodiment. In the flowchart shown in FIG. 7, steps identical with those of the embodiment shown in FIG. 6 are designated by like step numbers.

In FIG. 7, the digital camera 104 starts communicating in the ad-hoc mode and transmits a beacon frame at step 601 when the user enters a print-start command. In the flowchart shown in FIG. 7, steps 601 to 604 are identical with those of FIG. 6 and therefore need not be described again.

If the result of the function search at step 603 is the discovery of printers having the desired function, control proceeds to step 704. Here the digital camera 104 determines whether the function search has ended. This determination is based upon whether the number of successes in the search has attained a prescribed number or whether a prescribed period of time has elapsed. If it is determined that the function search has ended, control proceeds to step 705.

At step 705, the digital camera 104 displays information, which is indicative of the discovered printers having the desired function, on the user interface 303 in a form recognizable by the user, e.g., in the form of the printer names. The user selects the desired printer from the displayed printers using the user interface 303. After the digital camera 104 transmits a printer selection signal to the selected printer, as by transmitting a print request frame to the selected printer, the digital camera 104 executes print processing from step 604 onward. This processing is similar to the processing of FIG. 6 and need not be described again.

By thus interposing selection of a printer from the digital camera, the operator of the digital camera can be given some leeway in intervening at the time printing starts. As a result, in addition to the effects of the first embodiment, other effect is that the operator is capable whenever necessary of performing such operations as exchange of paper, replenishment of toner and selection of the image to be printed. This provides better operability.

It should be noted that a storage device that stores image data but does not possess a picture taking function or a digital movie camera that has a still-picture taking function may be provided with the communication function of the digital camera 104. Functions common to these devices are the wireless communication function and function for storing image data according to the first or second embodiment.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-119259 filed on Apr. 14, 2004, which is hereby incorporated by reference herein.

The invention claimed is:

1. A communication control method for controlling communication between a first wireless communication apparatus and a second wireless communication apparatus, the first wireless communication apparatus being configured to communicate wirelessly in a first communication mode in which communication is performed via a base station and a second communication mode in which communication is performed with the second wireless communication apparatus directly, and the second wireless communication apparatus being configured to communicate wirelessly in the second communication mode, the method comprising:

a connecting step of establishing a connection between the first wireless communication apparatus and the second wireless communication apparatus in the second communication mode in response to a search signal from the second wireless communication apparatus received by the first wireless communication apparatus during communication by the first wireless communication apparatus in the first communication mode, the signal giving notification of the existence of the second wireless communication apparatus;

a determining step of determining, by one of the first or second wireless communication apparatus, whether the other of the first or second wireless communication apparatus possesses a desired function through the connection in the second communication mode established in the connecting step;

a data communicating step of communicating data between the second wireless communication apparatus and the first wireless communication apparatus in the second communication mode when it is determined that the other of the first or second wireless communication apparatus possesses the desired function at the determining step; and a switching step of switching, by the first wireless communication apparatus, the communication mode of the first wireless communication apparatus to the first communication mode when it is determined that the other of the first or second wireless communication apparatus does not possess the desired function.

2. A first wireless communication apparatus configured to communicate with a second wireless communication apparatus in a first communication mode in which communication is performed via a base station and a second communication mode in which communication is performed with the second wireless communication apparatus directly, the first wireless communication apparatus comprising:

receiving means for receiving a signal from the second wireless communication apparatus giving notification of the existence of the second wireless communication apparatus, during communication in the first communication mode;

connecting means for making a connection to the second wireless communication apparatus in the second communication mode based upon information contained in the signal received by the receiving means;

determining means for determining whether a predetermined function is executable in the second wireless communication apparatus through the connection in the second communication mode with the second wireless communication apparatus made by the connecting means;

data receiving means for receiving data, which is transmitted in the second communication mode when it is determined by the determining means that the predetermined function is executable in the second wireless communication apparatus; and switching means for switching the communication mode of the first wireless communication apparatus to the first communication mode when it is determined by the determining means that the predetermined function is not executable in the second wireless communication apparatus.

3. The apparatus according to claim 2, further comprising printing means for printing an image based upon the data that has been received by the data receiving means, wherein the determining means determines whether or not a function for implementing a protocol of printing is executable.

4. The apparatus according to claim 2, wherein the connecting means makes a connection to the second wireless communication apparatus in the second communication mode when the signal received by the receiving means contains an indication of communicating in the second communication mode.

5. The apparatus according to claim 4, wherein the connecting means terminates communication in the first communication mode and makes a connection to the second wireless communication apparatus in the second communication mode.

6. The apparatus according to claim 2, wherein the connecting means makes a connection to the wireless communication apparatus based upon a network identifier contained in the signal received by the receiving means.

7. A second wireless communication apparatus configured to wirelessly communicate with a first wireless communication apparatus which is configured to communicate in a first communication mode in which communication is performed via a base station and a second communication mode in which communication is performed directly between the wireless communication apparatuses, the second wireless communication apparatus comprising:

transmitting means for transmitting a signal which includes information indicating that the second wireless communication apparatus is communicating in the second communication mode, to the first wireless communication apparatus that is communicating in the first communication mode;

determining means for determining whether a predetermined function is executable in the first wireless communication apparatus through a connection in the second communication mode to the first wireless communication apparatus which has been made in response to the signal;

data transmitting means for transmitting data to the first wireless communication apparatus when it is determined by the determining means that the predetermined function is executable in the first wireless communication apparatus; and re-transmitting means for re-transmitting the signal which includes information indicative of communicating in the second communication mode for connecting with a third wireless communication apparatus other than the first wireless communication apparatus when it is determined by the determining means that the predetermined function is not executable in the first wireless communication apparatus.

8. The apparatus according to claim 7, further comprising picture taking means for taking a picture optically as an image data;

wherein the data transmitting means transmits the image data obtained by the picture taking by the picture taking means.

9. The apparatus according to claim 7, further comprising display means for displaying information for identifying a wireless communication apparatus, which has been determined to possess the predetermined function, in accordance with the determination made by the determination means;

wherein the connection in the second communication mode is made to the wireless communication apparatus, which is identified by information selected by a user, based upon the display presented by the display means, and the data is transmitted by the data transmitting means.

* * * * *